Jan. 10, 1950
C. R. AUSTIN ET AL
2,494,277
CERAMIC BODY AND BATCH FOR MAKING SAME
Filed Nov. 16, 1944
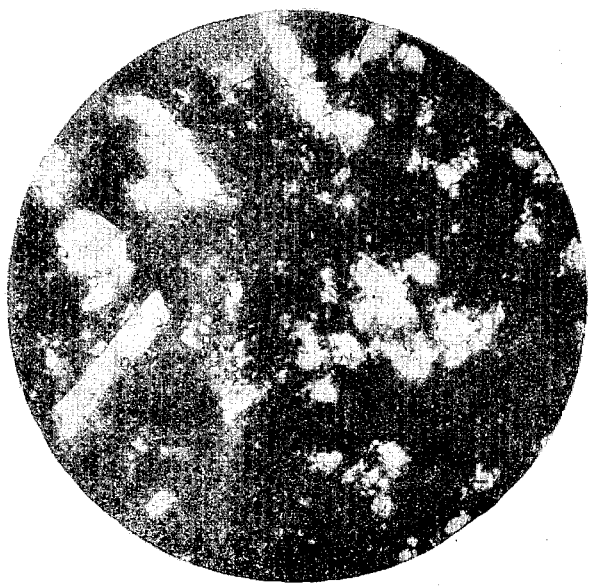
INVENTORS
Chester R. Austin.
Edwin J. Rogers
BY Corbett, Mahoney + Miller
ATTORNEYS Patented Jan. 10, 1950

2,494,277

UNITED STATES PATENT OFFICE 2,494,277

CERAMIC BODY AND BATCH FOR MAKING SAME

Chester R. Austin, Columbus, Ohio, and Edwin J. Rogers, Troy, N. Y., assignors, by mesne assignments, to United Aircraft Corporation, East Hartford, Conn., a corporation of Delaware, and Ethyl Corporation, Detroit, Mich., a corporation of Delaware Application November 16, 1944, Serial No. 563,666

3 Claims. (Cl. 106—63)

The present invention relates to ceramic bodies. More especially it is concerned with the production of an electrical insulating material that is particularly adapted for spark-plug insulators and for uses requiring similar qualities.

The increasing use of ceramic insulators in aircraft engines has brought about a demand for spark-plug insulators of a superior quality. Porcelain spark-plug insulators were among the first used in internal combustion engines. Later, bodies of the mullite type were developed. The present demand for the best possible materials has brought about the development of bodies of high alumina content. Initially, these bodies were made of almost pure alumina; however, in such cases extremely high burning temperatures of around 3200° F. or higher are required to effect the re-crystallization that is necessary to produce the proper characteristics. Such high temperatures exceed the limits of most commercial kilns and, therefore, introduce serious production problems. Mica plugs are unsatisfactory for high-output engines.

The ideal spark-plug insulator must be resistant to thermal shock in order to withstand the marked fluctuations in temperature that occur in service. It must also have relatively high thermal conductivity so that sufficient heat is conducted away from the tip end to prevent pre-ignition. High thermal expansion is also desirable to insure that it expands and contracts as uniformly as possible with the metal parts with which it is assembled. In addition, of course, it must maintain its electrical insulating properties at the elevated temperatures to which it is subjected in service, and it must resist attack at elevated temperatures by lead compounds. However, inasmuch as most sparkplug failures can be traced, apparently, to insufficient strength, one of the most important characteristics of the ideal insulator is high mechanical strength. Sufficient strength is required to withstand both the stresses produced during assembly and the stresses that arise during service.

From a manufacturing standpoint, it is desirable that the ceramic body of the insulator retain its form and symmetry and that it have a uniform shrinkage. This uniformity makes possible the production of an article having close dimensional tolerances. In addition, the body should mature at a temperature below 3000° F. so that the insulators may be burned in commercially available kilns.

It is, therefore, one of the objects of our invention to provide a ceramic body suitable for spark-plug insulators having high mechanical strength, high thermal conductivity, high thermal expansion, and good electrical insulating properties and resistance to attack by lead compounds at elevated temperatures.

A further object of our invention is to produce such an insulator by a careful selection of ingredients to insure that losses occurring through warpage during firing are maintained at a minimum.

Another object of our invention is to provide, by careful selection of ingredients, an alumina-base ceramic body in which the alumina can be re-crystallized at temperatures below 3000° F.

A further object of our invention is to provide a ceramic body wherein good electrical properties are maintained at elevated temperatures even though an appreciable amount of alkalies may be present.

It is well known that various fluxes are effective to lower materially the re-crystallization temperature of alumina bodies. Such materials as MgO, BaO, CaO, $Fe_2O_3$, and $SiO_2$ have been proposed as fluxes for this purpose; however, none of these fluxes yields an insulator having all of the desired characteristics. If sufficient magnesia is added to lower the re-crystallization temperature, a magnesia spinel crystallizes in the cubic system and markedly lowers the strength of the resulting insulator. Additions of barium oxide also prevent the attainment of the desired strength. Calcium oxide, when added in amounts sufficient to decrease the burning temperature to the desired range, tends to produce bodies having an undesirably short burning range, a rather coarse crystal structure, and a definite tendency to warp badly during firing. The addition of significant amounts of $Fe_2O_3$ tends to result in a rather drastic loss of electrical insulating properties at elevated temperatures, particularly if the body is burned in a reducing atmosphere. Silica, when present in amounts adequate to lower the re-crystallization temperature to the desired range, tends to cause a marked loss of strength and resistance to thermal shock. An increase in the silica content also lowers the resistance of the body to attack by lead oxide.

The above and other objects and advantages of our invention will appear in the following description and appended claims when considered in conjunction with the accompanying drawing which forms a part of this specification.

In said drawing the single figure shows a reproduction of a photomicrograph of a typical thin-section of a body composed primarily of alumina and containing small amounts of calcium oxide, silica, and boric oxide in accordance with our invention.

Before explaining in detail the present invention, it is to be understood that the invention is not limited in its application to the details illustrated in the accompanying drawing, since the invention is capable of other embodiments and of being practiced or carried out in various ways. Also, it is to be understood that the phraseology or terminology employed herein is for the purpose of description and not of limitation, and it is not intended to limit the invention herein claimed beyond the requirements of the prior art.

We have found, and have disclosed and claimed in our copending application Ceramic body, Serial No. 563,664, filed November 16, 1944, now Patent Number 2,423,958, that alumina bodies having the requisite properties for spark-plug insulators and other ceramic applications, can be produced by the addition of the proper amount of calcium oxide (preferably added as a calcium oxide-bearing material) and silica. We have found further and have disclosed and claimed in the aforementioned copending application, that it is particularly advantageous and desirable to introduce the calcium oxide into the body as tri-calcium penta-aluminate. This latter is especially true when the tri-calcium penta-aluminate is fused and allowed to crystallize prior to its incorporation in the body. Some of these bodies have compressive strengths as high as 240,000 pounds per square inch.

We have now discovered that even higher strengths can be obtained by incorporating in the alumina body small amounts of calcium oxide, silica, and boric oxide. Again, the best results are obtained when the calcium oxide is added as tri-calcium penta-aluminate.

As mentioned hereinbefore, we have discovered that particularly desirable properties may be obtained in ceramic bodies composed essentially of alumina, calcium oxide, silica, and boric oxide. In general, we have found that the best results are obtained with bodies containing from 0.25 to 3.0 per cent calcium oxide, from 0.25 to 5.0 per cent silica, and from 0.25 to 5.0 per cent boric oxide, the balance of the body being essentially alumina. However, we prefer to use, for the highest strengths and for the greatest ease of handling, from 0.5 to 2.0 per cent calcium oxide, from 0.5 to 3.0 per cent silica, and from 0.5 to 3.0 per cent of boric oxide, with the balance of the body essentially alumina.

In other words, the ceramic bodies of this invention contain, in general, at least about 87 per cent of alumina, in excess of about 0.25 per cent of calcium oxide, more than about 0.25 per cent of silica, and in excess of about 0.25 per cent of boric oxide.

For the most commercially attractive bodies, we prefer to keep the alumina content of the bodies between 91 to 98.5 per cent, with from 0.5 to 3.0 per cent calcium oxide, from 0.5 to 3.0 per cent silica, and from 0.5 to 3.0 per cent boric oxide. Unless otherwise specified, all percentages referred to herein will be understood to represent percentages by weight.

Although only four components have been specifically mentioned in the foregoing discussion, the ceramic bodies of our invention may also include small amounts of other substances. For example, we have found that ceramic bodies having excellent properties may be produced even though the alumina contains as much as 0.5 or 0.6 per cent alkali, expressed as $Na_2O$. Also, we have found that the calcium oxide content of the body may be obtained from a relatively pure calcium carbonate or, if desired, from a high-calcium limestone which may contain some incidental impurities. It is desirable, however, that the four primary components be present in the proportions given above, regardless of what other non-essential ingredients may be present. In general, we prefer to keep the amounts of the non-essential ingredients as low as possible.

As a source of alumina, we may use any relatively pure grade; however, we prefer to use one of the various grades manufactured by the Bayer process. We have found that the best results are obtained when the alumina is calcined, preferably at a temperature in excess of 2000° F., prior to use in the body. As previously discussed, the alumina used in the ceramic bodies of our invention may contain as much as 0.5 or 0.6 per cent of alkali, expressed as $Na_2O$, without destroying the high electrical insulating properties at elevated temperatures.

Although, as mentioned above, the calcium oxide may be added to the batch as calcium oxide or in any form, such as calcium carbonate or high-lime limestone, that will decompose during processing to yield calcium oxide, we prefer to add the calcium oxide to the body as tri-calcium penta-aluminate, and we have found that it is decidedly advantageous if the tri-calcium penta-aluminate is fused and allowed to crystallize prior to its incorporation in the batch.

In the preparation of fused tri-calcium penta-aluminate, we prefer that calcium carbonate or a high-calcium quicklime be used as the source of calcium oxide and that Bayer process alumina preferably be used as the source of alumina. These materials, combined in the proper proportions, are then sintered or fused in an electric arc or in any furnace capable of producing the temperature to effect combination, for example, approximately 3200° F.

We have used, for example, the following batch composition for the production of tri-calcium penta-aluminate by fusion in a direct-arc electric furnace: 26.9 per cent high-calcium quicklime (pebble) and 73.1 per cent Bayer alumina (calcined). The quicklime used in this batch contained 89.5 per cent calcium oxide, and the alumina contained practically 100 per cent alumina. Other sources of calcium oxide and alumina may be used; however, in any combination, the ingredients are proportioned to give an approximate molecular ratio of 3:5 for the calcium oxide and the alumina, respectively.

Chemical analyses of the solidified material from representative fusions gave the results shown in Table 1.

TABLE 1

Chemical analyses of typical tri-calcium penta-aluminate fusions

| Sample No. | Chemical Composition, Per Cent | | |
|---|---|---|---|
| | $Al_2O_3$ | CaO | $SiO_2$[1] |
| 1 | 74.5 | 22.2 | 2.6 |
| 2 | 73.4 | 24.2 | 2.2 |
| 3 | 74.4 | 23.0 | 1.9 |
| 4 | 74.9 | 22.8 | 1.7 |
| 5 | 73.1 | 23.9 | 2.1 |
| 6 | 77.2 | 17.6 | 5.1 |

[1] Silica over about 0.9 per cent was introduced in grinding operation used to prepare samples for chemical analysis.

Petrographic examination of some of these samples indicates that they contain approximately 90 per cent of tri-calcium penta-aluminate and from 5 to 10 per cent of mono-calcium aluminate, the balance being essentially a mixed mass of isolated crystals and glass.

The boric oxide content of the bodies of this invention may be added in any convenient form. For example, boric acid ($H_3BO_3$) may be incorporated in the batch. Likewise, we have obtained excellent results by the use of calcined boric oxide and boron aluminate ($B_2O_3.Al_2O_3$).

In the preferred method of practicing our invention, the tri-calcium penta-aluminate is ground so that a substantial amount will pass a 325-mesh sieve. For most purposes, we prefer that at least 90 per cent of the material is less than 325-mesh. Either dry or wet grinding may be employed; however, we have found that the best results can be most readily obtained by wet grinding, using alcohol as a medium. The wet material, if the wet process is used, is dried and is then ready for incorporation in the batch. If calcium carbonate, or some other material yielding calcium oxide during the subsequent processing, is used, the same general method of preparation is followed.

The alumina is also either dry or wet ground so that a substantial proportion, preferably at least 99 per cent, will pass through a 325-mesh sieve. We prefer to wet-grind, using an aqueous medium; and, if this procedure is followed, the fine alumina is dried and is then ready for use in the raw batch.

The silica and the boric-oxide-yielding material to be added may be included with the alumina and ground at the same time, or they may be ground separately, either dry or wet, so that a substantial portion, preferably at least 99 per cent, passes a 200-mesh sieve.

The proper proportions of alumina, tri-calcium penta-aluminate (or other material forming calcium oxide on subsequent processing), silica, and boric oxide, selected to give the desired final proportions as hereinbefore disclosed, are then mixed with a suitable binder and/or plasticizer. An alternative method is to place these ingredients in a ball mill with alcohol or water and grind for a short time, say, one hour, dry, and then mix with the binder or plasticizer. Numerous materials can be used as binders and plasticizers; however, we have found that excellent results can be obtained by the use of various mixtures of such materials as water, ammonium oleate, etc. For example, the following is a typical raw batch: 88 per cent alumina, 10 per cent fused tri-calcium penta-aluminate, 1.5 per cent silica, and 0.5 per cent boric oxide; to this dry batch is added 19.3 per cent of water, 0.5 per cent of ammonium oleate, and 0.2 per cent of low-viscosity Cancoloid ammonium alginate.

The raw batch is then thoroughly mixed. Various mixing devices can be used; for example, both Lancaster and Simpson mixers have given good results. The mixed batch may, if desired, then be passed through an aerator, dust mill, pulverizer, or other suitable machine to prepare it for use in fabrication.

The prepared batch is then fabricated into the desired shape or into a form from which the desired shape can be obtained by a further operation, such as machining or grinding. In some cases it is desirable to dry the fabricated piece before the machining or grinding operation. We have found pressure molding to be particularly applicable. The pressure used will vary with the shape and the intended application of the article being produced and with the amount and type of binder and plasticizer used; however, we have found that pressures of 5000 pounds per square inch, or more, are applicable for most purposes.

The fabricated article may then be dried and/or burned, or subjected to further forming operations and then dried and/or burned. The burning schedule may also vary considerably, depending upon the final application for which the ceramic body is to be used. In general, the schedule should be such that uniform heating is obtained and, especially in the production of spark-plug insulators, the time and the temperature of the burning must be adjusted to insure the production of a non-porous product. The porosity of the final body may be judged by immersion of the product in an alcohol-fuchsine dye solution at approximately 1000 pounds per square inch pressure for about ½ hour. The dye penetrates the porous areas, thereby disclosing their location. We have found that the following burning schedule produces excellent results on the ceramic bodies coming within the scope of our invention: Heat to about 2930° F. in approximately 14 hours, hold at that temperature for about 4 hours, and cool in place. However, burns in which the body was heated to 2750° F. in 1½ hours, held at that temperature for 6 hours, and cooled in place, have produced satisfactory results.

In the practice of the present invention, we have found that the grinding of the various components of the batch in a porcelain mill with porcelain balls tends to introduce some silica into the materials. It will be understood, of course, that in discussing the limits of the various constituents we refer to the total silica content of the finished product, whether the silica is introduced separately, as pick-up during grinding, as impurities in the raw materials used, or as a combination of two or more sources. Under standard conditions, the amount of silica introduced extraneously remains relatively constant; therefore, the final silica content of the product may be regulated by the amount of silica added, as such, to the raw batch.

The effect of varying the percentages of the various components of our ceramic body is shown in the following tables. All of the bodies recorded were prepared as outlined above and were burned to 2930° F. in 14 hours, held at that temperature for 4 hours, and cooled in place. In the case of bodies having appreciable porosity, no compressive strength determinations were made.

Table 2 shows the effect of the silica content on the properties of bodies containing 2.3 per cent of calcium oxide, added as a 10 per cent addition of tri-calcium penta-aluminate, and varying amounts of boric oxide. These data indicate that the bodies tend to be porous when the silica content is below 0.25 per cent. These bodies were made with silica-free alumina; therefore, the final silica content of the body is essentially equivalent to that added as such; small amounts were added in the tri-calcium penta-aluminate.

Table 3 shows the effect of varying calcium oxide and boric oxide contents in the ceramic bodies of this invention. In these bodies, the silica content was obtained by grinding the materials in a porcelain mill. As these data show, the bodies tend to become porous when 4.6 per cent or more calcium oxide is incorporated.

Table 4 illustrates the properties obtained by the use of calcium carbonate to furnish the calcium oxide content of the body. Again, the addition of 4.6 per cent, or more, calcium oxide is found to produce a porous body.

Table 5 shows the effect of varying boric oxide contents. As illustrated by these data, the addition of 1 per cent of $B_2O_3$ is effective in increasing the strength of the body from 205,000 pounds per square inch (batch No. 6213) to 241,000 pounds per square inch (batch No. 6287).

Tables 2, 3, 4, and 5, referred to above, appear in the following pages.

TABLE 2

*Effect of varying $SiO_2$ and $B_2O_3$ contents in ceramic bodies prepared from a mixture of alumina, silica, tri-calcium penta-aluminate, and boric acid*

| Batch No. | Batch Composition, Per Cent | | | | Calculated Burned Composition, Per Cent | | | | Burned | | Dye Penetration |
|---|---|---|---|---|---|---|---|---|---|---|---|
| | $Al_2O_3$ | $3CaO.5Al_2O_3$ | $SiO_2$ | $H_3BO_3$ | $Al_2O_3$ | CaO | $SiO_2$ | $B_2O_3$ | Linear Shrinkage, Per Cent | Compressive Strength, Lbs./Sq. In. | |
| 9943 | 89.1 | 10.0 | | 0.9 | 97.0 | 2.3 | 0.2 | 0.5 | 22.3 | 233,000 | Total. |
| 9946 | 88.7 | 9.9 | 0.5 | 0.9 | 96.5 | 2.3 | 0.7 | 0.5 | 23.3 | 256,000 | 0 |
| 9949 | 88.2 | 9.9 | 1.0 | 0.9 | 96.0 | 2.3 | 1.2 | 0.5 | 23.4 | 284,000 | 0 |
| 9952 | 87.8 | 9.8 | 1.5 | 0.9 | 95.5 | 2.3 | 1.7 | 0.5 | 23.7 | | 0 |
| 9944 | 88.4 | 9.8 | | 1.8 | 96.5 | 2.3 | 0.2 | 1.0 | 22.2 | 277,000 | Total. |
| 9947 | 87.9 | 9.8 | 0.5 | 1.8 | 96.0 | 2.3 | 0.7 | 1.0 | 23.8 | 263,000 | 0 |
| 9950 | 87.5 | 9.7 | 1.0 | 1.8 | 95.5 | 2.3 | 1.2 | 1.0 | 23.5 | 242,000 | 0 |
| 9953 | 87.0 | 9.7 | 1.5 | 1.8 | 95.0 | 2.3 | 1.7 | 1.0 | 23.4 | | 0 |
| 9945 | 86.9 | 9.6 | | 3.5 | 95.5 | 2.3 | 0.2 | 2.0 | 22.3 | 259,000 | Total. |
| 9948 | 86.4 | 9.6 | 0.5 | 3.5 | 95.0 | 2.3 | 0.7 | 2.0 | 23.6 | 222,000 | 0 |
| 9951 | 86.0 | 9.5 | 1.0 | 3.5 | 94.5 | 2.3 | 1.2 | 2.0 | 23.5 | 201,000 | 0 |
| 9954 | 85.5 | 9.5 | 1.5 | 3.5 | 94.0 | 2.3 | 1.7 | 2.0 | 23.3 | | 0 |

TABLE 3

*Effect of varying $SiO_2$ and $B_2O_3$ contents in ceramic bodies prepared from a mixture of alumina, silica, tri-calcium penta-aluminate, and boric acid*

| Batch No. | Batch Composition, Per Cent | | | | Calculated Burned Composition, Per Cent | | | | Burned | | Dye Penetration |
|---|---|---|---|---|---|---|---|---|---|---|---|
| | $Al_2O_3$ | $3CaO.5Al_2O_3$ | $SiO_2$ | $H_3BO_3$ | $Al_2O_3$ | CaO | $SiO_2$ | $B_2O_3$ | Linear Shrinkage, Per Cent | Compressive Strength, Lbs./Sq. In. | |
| 7042 | 94.5 | 2.2 | 1.5 | 1.8 | 97.0 | 0.5 | 1.5 | 1.0 | 22.9 | 196,000 | 0 |
| 6287 | 87.4 | 9.9 | 0.9 | 1.8 | 95.5 | 2.3 | 1.2 | 1.0 | 22.3 | 241,000 | 0 |
| 7046 | 77.2 | 19.8 | 1.2 | 1.8 | 92.7 | 4.6 | 1.7 | 1.0 | 19.0 | | Total. |
| 7073 | 62.6 | 34.7 | 0.9 | 1.8 | 89.1 | 8.1 | 1.8 | 1.0 | 7.6 | | Total. |
| 7077 | 47.8 | 49.6 | 0.8 | 1.8 | 85.5 | 11.5 | 2.0 | 1.0 | 10.4 | | Total. |
| 7043 | 91.1 | 2.1 | 1.5 | 5.3 | 95.0 | 0.5 | 1.5 | 3.0 | 22.9 | 220,000 | 0 |
| 6289 | 84.0 | 9.8 | 0.9 | 5.3 | 93.6 | 2.3 | 1.1 | 3.0 | 21.9 | 215,000 | 0 |
| 7047 | 74.1 | 19.5 | 1.1 | 5.3 | 90.8 | 4.6 | 1.6 | 3.0 | 18.5 | | Total. |
| 7074 | 59.6 | 34.2 | 0.9 | 5.3 | 87.1 | 8.1 | 1.8 | 3.0 | 6.1 | | Total. |
| 7078 | 45.2 | 48.8 | 0.7 | 5.3 | 83.6 | 11.5 | 1.9 | 3.0 | 10.5 | | Total. |
| 7044 | 87.9 | 2.1 | 1.3 | 8.7 | 93.1 | 0.5 | 1.4 | 5.0 | 22.8 | 165,000 | 0 |
| 6291 | 80.9 | 9.6 | 0.8 | 8.7 | 91.6 | 2.3 | 1.1 | 5.0 | 21.9 | 262,000 | 0 |
| 7048 | 71.0 | 19.2 | 1.1 | 8.7 | 88.8 | 4.6 | 1.6 | 5.0 | 19.1 | | Total. |
| 7075 | 56.8 | 33.6 | 0.9 | 8.7 | 85.1 | 8.1 | 1.8 | 5.0 | 5.6 | | Total. |

TABLE 4

*Effect of varying CaO and $B_2O_3$ contents in ceramic bodies prepared from a mixture of alumina, silica, calcium carbonate, and boric acid*

| Batch No. | Batch Composition, Per Cent | | | | Calculated Burned Composition, Per Cent | | | | Burned | | Dye Penetration |
|---|---|---|---|---|---|---|---|---|---|---|---|
| | $Al_2O_3$ | $CaCO_3$ | $SiO_2$ | $H_3BO_3$ | $Al_2O_3$ | CaO | $SiO_2$ | $B_2O_3$ | Linear Shrinkage, Per Cent | Compressive Strength, Lbs./Sq. In. | |
| 6956 | 95.8 | 0.9 | 1.5 | 1.8 | 97.0 | 0.5 | 1.5 | 1.0 | 22.9 | 224,000 | 0 |
| 7081 | 92.5 | 4.3 | 1.4 | 1.8 | 95.1 | 2.5 | 1.4 | 1.0 | 21.6 | 168,000 | 0 |
| 7012 | 89.1 | 7.9 | 1.3 | 1.7 | 93.0 | 4.6 | 1.4 | 1.0 | 19.4 | | Total. |
| 7016 | 78.5 | 18.7 | 1.2 | 1.6 | 86.2 | 11.5 | 1.3 | 1.0 | 15.4 | | Total. |
| 6957 | 92.5 | 0.9 | 1.4 | 5.2 | 95.1 | 0.5 | 1.4 | 3.0 | 23.1 | 218,000 | 0 |
| 7082 | 89.2 | 4.3 | 1.3 | 5.2 | 93.1 | 2.5 | 1.4 | 3.0 | 21.8 | 144,000 | 0 |
| 7013 | 85.9 | 7.7 | 1.3 | 5.1 | 91.0 | 4.6 | 1.4 | 3.0 | 19.3 | | Total. |
| 7017 | 75.5 | 18.4 | 1.2 | 4.9 | 84.2 | 11.5 | 1.3 | 3.0 | 16.2 | | Total. |
| 7004 | 89.2 | 0.9 | 1.3 | 8.6 | 93.1 | 0.5 | 1.4 | 5.0 | 22.9 | 146,000 | 0 |
| 7083 | 86.0 | 4.2 | 1.3 | 8.5 | 91.1 | 2.5 | 1.4 | 5.0 | 21.6 | 237,000 | 0 |
| 7014 | 82.7 | 7.6 | 1.3 | 8.4 | 89.0 | 4.6 | 1.4 | 5.0 | 19.3 | | Total. |
| 7018 | 72.8 | 18.1 | 1.1 | 8.0 | 82.3 | 11.5 | 1.2 | 5.0 | 14.8 | | Total. |

TABLE 5

*Effect of varying $B_2O_3$ contents in ceramic bodies prepared from a mixture of alumina, silica, tri-calcium penta-aluminate, and boric acid*

| Batch No. | Batch Composition, Per Cent | | | | Calculated Burned Composition, Per Cent | | | | Burned | | Dye Penetration |
|---|---|---|---|---|---|---|---|---|---|---|---|
| | $Al_2O_3$ | $3CaO.5Al_2O_3$ | $SiO_2$ | $H_3BO_3$ | $Al_2O_3$ | $CaO$ | $SiO_2$ | $B_2O_3$ | Linear Shrinkage, Per Cent | Compressive Strength, Lbs./Sq. In. | |
| 6213 | 89.0 | 10.0 | 1.0 | ------ | 96.7 | 2.0 | 1.3 | ------ | 21.8 | 205,000 | 0 |
| 6287 | 87.4 | 9.9 | 0.9 | 1.8 | 95.5 | 2.3 | 1.2 | 1.0 | 22.3 | 241,000 | 0 |
| 6288 | 85.9 | 9.8 | 0.8 | 3.5 | 94.6 | 2.3 | 1.1 | 2.0 | 22.1 | 240,000 | 0 |
| 6289 | 84.1 | 9.8 | 0.8 | 5.3 | 93.6 | 2.3 | 1.1 | 3.0 | 21.9 | 215,000 | 0 |
| 6290 | 82.5 | 9.7 | 0.8 | 7.0 | 92.6 | 2.3 | 1.1 | 4.0 | 22.0 | 245,000 | 0 |
| 6291 | 80.9 | 9.6 | 0.8 | 8.7 | 91.6 | 2.3 | 1.1 | 5.0 | 21.9 | 262,000 | 0 |

Petrographic examination of fired bodies made according to the present invention indicates that they have the same unique crystallization as discussed in our previously mentioned copending application. The body is composed of a glassy phase and of alpha alumina crystals. The glassy phase varies in amount depending upon the amount and the ratio of calcium oxide, silica, and boric oxide in the body. In general, however, the glassy phase varies between 15 and 20 per cent. These bodies are characterized by excellent euhedral crystalline development of hexagonal alumina plates and tabular crystals. The groundmass crystals have an average diameter of from about 5 to 10 microns. These bodies are also characterized by the presence of needle-like or lath-like alpha alumina crystals having a diameter as great as or greater than the average diameter of the crystals of the ground mass and a length of at least twice their diameter. A photomicrograph of a typical thin-section of one of the products of this invention is shown in the accompanying drawing.

Ceramic bodies were prepared from a batch containing 85.0 per cent alumina, 10.0 per cent tri-calcium penta-aluminate, and 5 per cent of boric oxide added as boric acid. The burned bodies contained approximately 91.5 per cent alumina, 1.1 per cent silica, 2.3 per cent calcium oxide, and 5.0 per cent boric oxide. Petrographic examination indicated that these bodies contained approximately 84 per cent of crystalline alpha alumina and 16 per cent glass. The alpha alumina crystals of the ground mass averaged approximately 5 microns in diameter, while the needle-like crystals had an average diameter of about 15 microns and lengths varying from 20 to 205 microns.

From the foregoing description of our invention, it will be apparent that we have provided a novel ceramic body having a novel structure. This body has an exceptionally high mechanical strength, good electrical insulating properties, good thermal conductivity, and excellent resistance to spalling and thermal shock. It is well known that boro-silicate glasses are highly resistant to thermal shock, and the heat resistance of these bodies may be, at least in part, a result of the fact that the alumina crystals are partly bonded by such a glass. These bodies are also resistant to attack at elevated temperatures by lead compounds. A particularly advantageous characteristic of this body is the fact that the desirable properties may be obtained by burning at temperatures below 3000° F.

Although we have indicated that the properties of the product of our invention make it particularly well suited for use as a spark-plug insulator, it will be understood that our ceramic body may be employed for other purposes, such as crucibles, thermo-couple protection tubes, extrusion dies, abrasion-resistant articles, heating element supports, general purpose electrical insulators, measuring gauges, nozzles and nozzle liners for use in applications involving resistance to the erosion action of hot gases and liquids, etc.

While some variations have been indicated in the method and the product of our invention, it will be readily understood that other modifications may be made within the scope of the appended claims.

Having thus described our invention, what we claim is:

1. A batch for the production of a ceramic body, which contains about 88% alumina, about 10% tri-calcium penta-aluminate, between 1 to 2% silica, and about 1% boric acid.

2. A burned ceramic body having an analysis of at least 87% alumina, and the balance composed predominantly of 0.25 to 3% calcium oxide, 0.25 to 5% silica, and 0.25 to 5% boron trioxide.

3. A burned ceramic body having an analysis of at least 91% alumina, 0.5 to 3% calcium oxide, 0.5 to 3% silica, and 0.5 to 3% boron trioxide.

CHESTER R. AUSTIN.
EDWIN J. ROGERS.

REFERENCES CITED

The following references are of record in the file of this patent:

UNITED STATES PATENTS

| Number | Name | Date |
|---|---|---|
| 201,910 | Caesar | Apr. 2, 1878 |

Certificate of Correction

Patent No. 2,494,277　　　　　　　　　　　　　　　　　　January 10, 1950

CHESTER R. AUSTIN ET AL.

It is hereby certified that errors appear in the printed specification of the above numbered patent requiring correction as follows:

Columns 7 and 8, Table 3, line 1 of the title, for "$SiO_2$" read $CaO$; columns 9 and 10, Table 5, sixth column thereof, for "$Al_2O_2$" read $Al_2O_3$;

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*